March 27, 1951 V. S. RHEELING 2,546,781
DUAL-PURPOSE VEHICLE WHEEL SPLASH GUARD
Filed Jan. 25, 1950
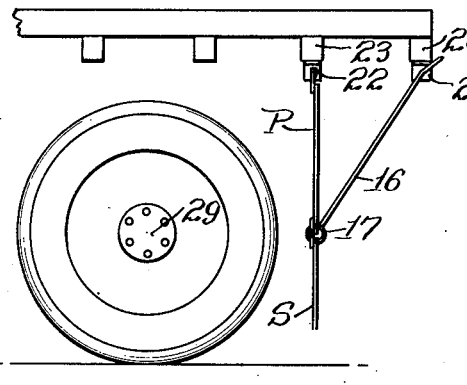
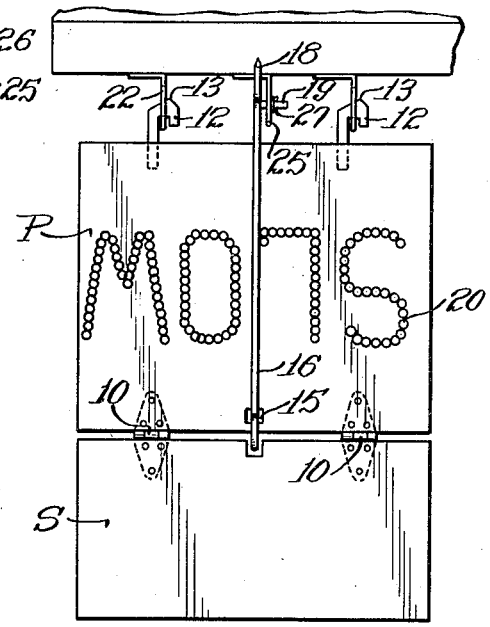
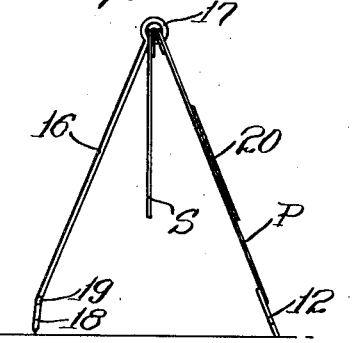
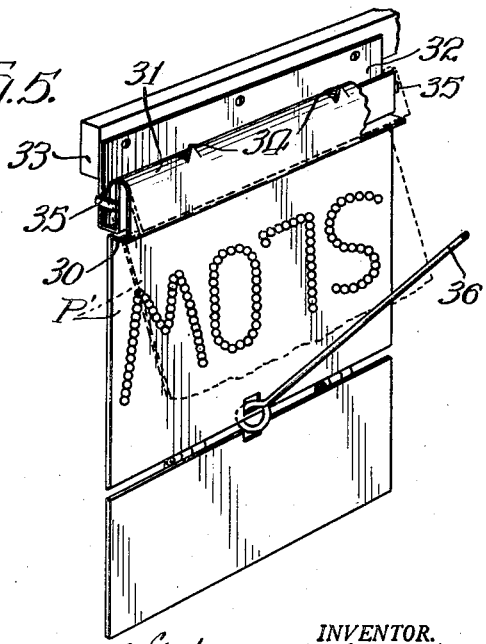
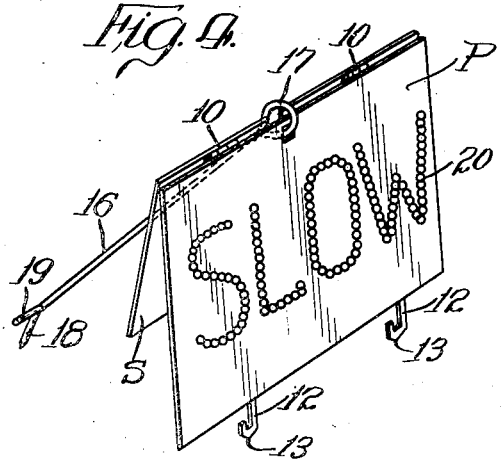
INVENTOR.
Victor S. Rheeling Patented Mar. 27, 1951

2,546,781

UNITED STATES PATENT OFFICE 2,546,781

DUAL-PURPOSE VEHICLE WHEEL SPLASH GUARD

Victor S. Rheeling, Princeton, Ill.

Application January 25, 1950, Serial No. 140,463

7 Claims. (Cl. 40—125)

This invention relates to a dual purpose splash guard for the rear wheels of large motor vehicles having overhanging bodies such as trucks, the splash guard being convertible into an emergency highway danger sign to warn oncoming vehicles of an obstruction on the highway.

It is a matter of common knowledge that the rear wheels of large motor trucks often cause stones, mud, ice, water and the like to be thrown rearwardly, thereby endangering motorists and others on the highway. The splash guard of my invention eliminates this danger.

When a truck is forced to stop on a highway because of accident, tire trouble, motor failure, etc., its is necessary to place emergency warning signs alongside the highway at a distance from the stopped truck, both front and rear, so as to caution oncoming vehicles. In many states this is required by law and consequently emergency danger and warning signals are carried in the cabs of practically all highway-operating trucks. These emergency signals frequently become lost and misplaced due to carelessness and to the fact that various drivers sometimes remove signals from one truck to replace missing ones in another truck. As a result it not infrequently happens, when a truck is forced to stop on a highway, that the needed warning signs are missing. This sometimes results in serious accidents and loss of life which otherwise might have been prevented.

The device of my invention provides a good serviceable splash guard which effectively intercepts any matter thrown rearwardly by the tires of a truck, thus eliminating this common highway hazard. This same device may be easily and quickly detached from a stopped truck and set up alongside the highway as a warning sign to oncoming motorists and as such it is equal to and better than most of the single-purpose signs now in use. It has the added advantage of always being with the truck so that it is there when needed. Since there are two of my guards on each vehicle—one for each of the rear wheels—a warning sign may be set out at each end of the stopped truck which is nearly always required. Furthermore my combined splash guard-warning signs do not take up any storage space, and in the event that by some accident one of them becomes lost this fact will become known by even the most casual inspection. Another advantage of the splash guard of my invention is that it may be easily disconnected from the truck for the purpose of cleaning, removing accumulated ice, etc.

Other objects and advantages will become apparent from a consideration of the following detailed description taken in connection with the accompanying drawings wherein the invention is shown. However, it will be understood that the invention is not limited to the details disclosed but includes all such various modifications as fall within the spirit of the invention and the scope of the appended claims.

Figure 1 is a side elevation showing my splash guard mounted on a truck body;

Fig. 2 is a rear elevation thereof;

Fig. 3 is a side elevation of the device when set up as a warning sign;

Fig. 4 is a perspective view of the warning sign; and

Fig. 5 is a perspective view of a splash guard of modified construction, shown attached to a truck body.

My invention comprises a rectangular plate P made of metal, plastic or other suitable material having a skirt S pivotally secured to its lower edge by means of a pair of hinges 10. Two hooks 12, each in the form of an inverted U and facing in the same direction, are secured to the upper edge of the plate. These hooks 12 are so shaped that they come to a point 13 on their upper extremities or crown as shown in Fig. 2. Adjacent the lower edge of the plate is an opening 15 through which passes one end of a brace rod 16 which is then bent around the lower edge and back upon itself to form an eye 17. This form of attachment allows the rod 16 to be pivotally swung from one side of the plate P to the other side and enough play is provided for limited pivotal movement endwise of the plate P. The other end portion 18 of the rod 16 which comes to a point is bent at an angle of about 30° as shown in Fig. 1. A finger 19 is extended laterally from the rod at right angles thereto near the end portion 18 (Figs. 2 and 4).

Reflector buttons 20 of the kind commonly used for road signs are mounted on the rear face of the plate so as to form the word Slow.

In use the splash guard of my invention is vertically suspended from beneath the body of a truck and behind the wheels thereof by means of the hooks 12 which interengage with depending brackets in the form of eyes 22 which may be fastened to a transverse frame 23 of the truck body. The rod 16 extends upwardly and rearwardly to where the finger 19 is inserted in an eye fitting 25 secured to a rearwardly positioned body frame member 26. The finger 19 is prevented from disengaging itself from the fitting 25 by means of a washer and cotter key assembly 27. The plate P extends downwardly approximately to the level of the wheel axle 29 and the hinged skirt S extends therebelow. The rod 16 acts as a brace to rigidly maintain the plate P against fore and aft swinging movement. In the event of the truck becoming mired in snow or mud up to its axle 29, the plate P will not be engaged thereby while the skirt S being free to swing fore and aft will remain undamaged.

When it is desired to use the splash guard as an emergency warning sign it is merely necessary to remove the cotter key 27 and disengage the finger 19 from the fitting 25 after which, by lifting the plate slightly, the hooks 12 may be disengaged from their eyes 22 and the entire unit will then be free of the truck and ready to be set up as a warning sign. This is accomplished by turning the plate P upside down so that the hooks 12 rest on the ground. The skirt S is swung over to a position adjacent the back side of the plate P and the rod 16 is swung rearwardly to supporting position behind the plate with its pointed end 18 pressing into the ground as shown in Figs. 3-4. By exerting a little pressure downwardly on the plate P the pointed ends 13 of the hooks 12 and the free end 18 of the rod will become imbedded in the earth, ice or snow as the case may be and serve to firmly anchor the sign in position.

A modified form of my invention is illustrated in Fig. 5 wherein the plate P' is formed with a shoulder 30 in the form of an offset and then is bent back upon itself at 31 to form a hook which engages a complementary U-shaped bracket 32 depending from the underside of the transverse frame 33 of a truck body. Tines 34 are struck out from the plate P' at 31. Metal strips 35 welded over the ends of the bracket 32 serve to confine the plate P against endwise movement, and the shoulder 30 locks the plate P' against upward movement while it is held in a vertical plane by the rod 36. However, by disengaging the rod 36 and tilting the plate P' slightly off vertical as indicated in dotted lines, so that the shoulder 30 is rearwardly of the bracket 32, the plate P' may be lifted upwardly and disengaged therefrom. This form of my invention eliminates any gap between the top of the plate P' and the underside of the truck body through which mud, water, etc. might pass. When used as a warning sign, the plate is inverted and the tines 34 are engaged with the ground to anchor the sign in position.

During the hours of daylight the warning sign of my invention is extremely visible to all approaching motorists and during the hours of darkness the reflector buttons forming the word Slow become visible immediately when picked up by the driving lights of oncoming vehicles.

I claim:

1. For use with a motor vehicle having an overhanging body, a portable combination rear wheel splash guard and emergency warning sign comprising a rectangular plate having a bracket on one edge thereof, a skirt pivotally secured to the plate adjacent the opposite edge thereof, a brace rod having one end pivotally secured to the plate edge adjacent the skirt, reflector warning means mounted on one face of the plate, the whole unit adapted, when functioning as a splash guard, to be detachably suspended by the bracket from bracket-engaging means on the under side of the motor vehicle body in a vertical position behind a rear wheel with the brace rod extending from the plate upwardly and rearwardly to the body at which point the upper end of the rod is held detachably in place by retaining means on the under side of the body, and when functioning as an emergency warning sign to be detached from the motor vehicle and set upon the ground inversely with the plate in an unright position slightly off center, the bracket resting on the ground, the rod extending from the upper edge of the plate angularly to the ground on the side toward which the plate is learning to support same, the skirt depending from the upper edge of the plate on the same side as the rod and the reflector warning means being on the other side of the plate fully exposed to the view of oncoming motorists.

2. For use with a motor vehicle having an overhanging body, a portable detachable rear wheel splash guard which is convertible into an emergency highway warning sign comprising a vertical rectangular plate having reflector means mounted on one face thereof, a hook, in the form of an inverted U having a pointed crown, extended from the upper edge of the plate and arranged for detachable engagement with retaining means on the under side of the vehicle body, a skirt depending from the lower edge of the plate, a brace rod having one end pivotally attached to the plate adjacent the lower edge thereof and the other end arranged for detachable engagement with retaining means on the under side of the vehicle body and disposed rearwardly of the first mentioned retaining means, the entire plate unit, when disengaged from the vehicle body, being arranged for conversion to an emergency highway warning sign in which form the plate is set upside down in a nearly vertical position with the pointed crown of the hook biting the ground and the brace rod extended from the plate uppermost edge downwardly and angularly to the ground on the side opposite the reflector means so as to supportingly maintain the plate in its nearly vertical plane.

3. For use with a motor vehicle having an overhanging body, a portable rear wheel splash guard comprising a rectangular plate having means on one edge detachably engageable with cooperating retaining means on the under side of the motor vehicle whereby to suspend said plate vertically therefrom, a brace rod having one end pivotally fastened to the plate near the bottom edge thereof and the other end detachably engageable with rearwardly positioned cooperating retaining means on the under side of the motor vehicle; and reflector means on one side of the plate, said plate, rod, and reflector means adapted to be converted into a portable emergency highway warning sign by disengaging the plate and rod from the cooperating retaining means and resting the plate edgewise upon the ground in an upright position slightly off-vertical with the brace rod extending from the uppermost edge angularly to the ground on the side toward which the plate is inclined and opposite the side having reflector means so as to support the plate in its nearly vertical position.

4. For use with a motor vehicle, a dual purpose portable rear wheel splash guard and emergency highway warning sign comprising a sign plate having means on one edge arranged for detachable engagement with cooperating retaining means on the motor vehicle whereby to suspend said plate vertically therefrom; a brace rod having one end attached to the plate and angularly formed near the other end, a finger extending at an angle of approximately 90° from the brace rod near the free end thereof and arranged for detachable engagement with cooperating retaining means on the motor vehicle, the plate unit, when disengaged from the motor vehicle, being convertible into an emergency highway warning sign by standing the plate edgewise upon the ground in a nearly vertical position and causing the free end of the brace rod to bite the ground so as to rigidly maintain the plate in position.

5. For use with a motor vehicle, a dual purpose portable rear wheel splash guard and emergency highway warning sign comprising a sign plate having means on one edge arranged for detachable engagement with cooperating retaining means on the motor vehicle whereby to suspend said plate vertically therefrom, a brace rod having one end attached to the plate, a finger extending from the brace rod and at right angles thereto near the other end of said rod and arranged for detachable engagement with cooperating retaining means on the motor vehicle, the plate assembly, when disengaged from the motor vehicle, being convertible into an emergency highway warning sign by standing the plate edgewise upon the ground in a nearly vertical position and causing the free end of the brace rod to bite the ground so as to support the plate in position.

6. For use with a motor vehicle, a dual purpose portable rear wheel splash guard and emergency highway warning sign comprising a vertically disposed rectangular sign plate having its uppermost edge portion turned back upon itself in the form of an inverted U and arranged for detachable connection with a complementary U-shaped bracket depending from the under side of a vehicle body whereby to suspend the plate vertically therefrom, a tine struck out from the plate upper extremity, a brace rod having one end pivotally attached to the plate near the bottom edge thereof and its other end adapted to be detachably connected to a bracket depending from the under side of a motor vehicle, said plate and rod when disconnected from the motor vehicle being convertible into an emergency highway warning sign by inverting the plate and standing it in a nearly vertical position with the tine biting the ground and the brace rod extended from the plate upper edge angularly and downwardly to the ground on the side toward which the plate is inclined so as to support the plate in its nearly vertical position.

7. For use with a motor vehicle having an overhanging body, a portable dual purpose rear wheel splash guard and emergency roadside warning sign comprising a rectangular sign plate having one edge portion bent back upon itself in the form of a channel, and arranged for detachable connection with a complementary bracket depending from beneath a vehicle body whereby to suspend the plate vertically therefrom, a shoulder on the plate parallel to and adjacent the channel opening, a brace rod having one end pivotally secured to the plate adjacent the side opposite the channel and its other end arranged for detachable connection with a bracket depending from beneath a vehicle body and disposed rearwardly of the first mentioned bracket, said plate and rod when disconnected from a vehicle body being converted into an emergency roadside warning sign by standing the plate edgewise upon the ground in a nearly vertical position with the channel edge down and the brace rod extending from the upper side angularly and downwardly to the ground on the side toward which the plate is inclined so as to support the plate in position.

VICTOR S. RHEELING.

No references cited.